United States Patent
Ehlgen et al.

(10) Patent No.: US 8,636,392 B2
(45) Date of Patent: Jan. 28, 2014

(54) METHOD AND DEVICE FOR CONTROLLING A LIGHT EMISSION OF A HEADLIGHT OF A VEHICLE

(75) Inventors: Tobias Ehlgen, Ravensburg (DE); Johannes Foltin, Ditzingen (DE); Robert Meisner, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/592,011

(22) Filed: Aug. 22, 2012

(65) Prior Publication Data

US 2013/0051043 A1    Feb. 28, 2013

(30) Foreign Application Priority Data

Aug. 23, 2011 (DE) .......... 10 2011 081 371

(51) Int. Cl.
*B60Q 1/00* (2006.01)

(52) U.S. Cl.
USPC ............. 362/466; 362/464; 362/465

(58) Field of Classification Search
USPC ........................ 362/466, 464, 465
See application file for complete search history.

(56) References Cited

U.S. PATENT DOCUMENTS

| | | | |
|---|---|---|---|
| 8,350,690 B2 * | 1/2013 | Biondo et al. | 340/469 |
| 2013/0051618 A1 * | 2/2013 | Foltin | 382/103 |
| 2013/0058116 A1 * | 3/2013 | Galbas et al. | 362/512 |

FOREIGN PATENT DOCUMENTS

| | | |
|---|---|---|
| DE | 10 254806 | 6/2004 |
| DE | 10 2005 051 049 | 5/2006 |
| DE | 10 2005 027 887 | 12/2006 |
| DE | 10 2006 050 546 | 4/2008 |
| DE | 10 2006 055 904 | 5/2008 |
| DE | 10 2008 053 945 | 5/2010 |
| DE | 10 2008 058 386 | 5/2010 |
| DE | 10 2009 054 101 | 6/2010 |
| DE | 10 2009 024 129 | 12/2010 |
| DE | 10 2009 028 344 | 2/2011 |
| DE | 10 2009 057 032 | 6/2011 |
| EP | 2 119 592 | 11/2009 |

OTHER PUBLICATIONS

Simon D. McLoughlin et al., "Classification of road sign type using mobile stereo vision," Proceedings of SPIE. Jun. 1, 2005, pp. 133-142.

* cited by examiner

*Primary Examiner* — Mary Ellen Bowman
(74) *Attorney, Agent, or Firm* — Kenyon & Kenyon LLP

(57) ABSTRACT

A method for controlling a light emission of at least one headlight of a vehicle. The method includes receiving a change enabling signal for performing a change of the light emission of the at least one headlight from an input emission characteristic to an output emission characteristic during a debouncing period and/or debouncing distance which begin(s) in response to the change enabling signal. The method also includes changing the light emission of the at least one headlight from the input emission characteristic to an intermediate emission characteristic in response to the change enabling signal. The method also includes changing the light emission of the at least one headlight from the intermediate emission characteristic to the output emission characteristic after the debouncing period and/or the debouncing distance has/have elapsed.

10 Claims, 8 Drawing Sheets

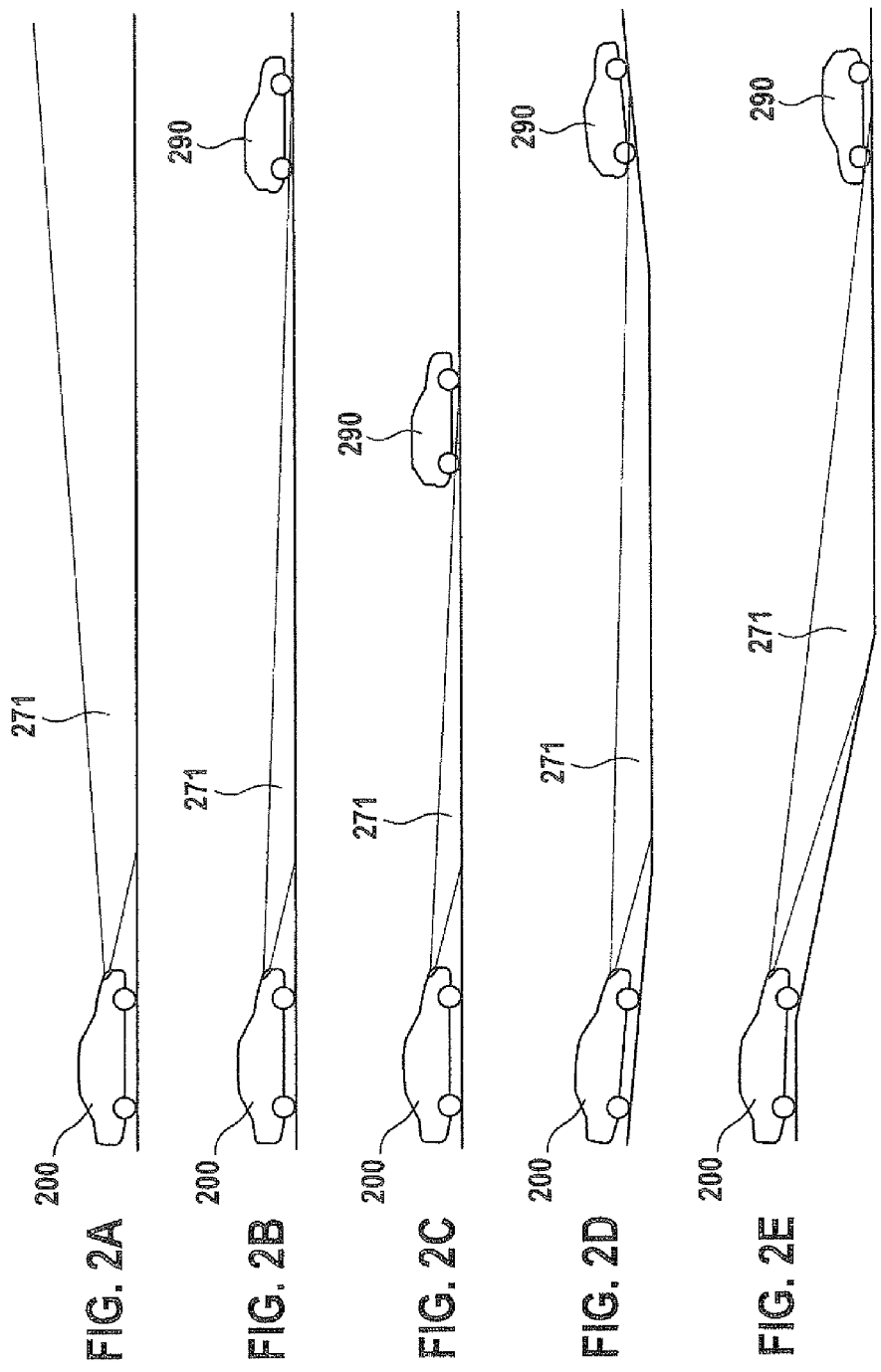

METHOD AND DEVICE FOR CONTROLLING A LIGHT EMISSION OF A HEADLIGHT OF A VEHICLE

RELATED APPLICATION INFORMATION

The present application claims priority to and the benefit of German patent application no. 10 2011 081 371.3, which was filed in Germany on Aug. 23, 2011, the disclosure of which is incorporated herein by reference.

FIELD OF THE INVENTION

The present invention relates to a method for controlling a light emission of a headlight of a vehicle, and a device which is configured to perform the steps of such a method.

BACKGROUND INFORMATION

When controlling the lights in a vehicle with the aid of a known high beam assistance system, debouncing periods or debouncing distances are used, for example to delay activation of the high beam. In this regard, in a high beam assistance system a certain debouncing period or debouncing distance is generally provided to avoid blinding a suddenly (re-)appearing vehicle which briefly disappears behind a curve or hilltop, for example. The debouncing is generally required in all high beam assistance systems. At night, as a rule the high beam is not used if other motorists are present in the traffic area that is relevant for blinding. The high beam may switched back on only when no other vehicle is present ahead of the vehicle in the traffic area that is relevant for blinding, for example, after an oncoming vehicle has driven past or a preceding vehicle has disappeared behind a curve.

Patent document EP 2 119 592 A1 discusses a control unit for controlling the light distribution of the main headlights of a motor vehicle.

SUMMARY OF THE INVENTION

Against this background, with the aid of the exemplary embodiments and/or exemplary methods of the present invention a method is presented for controlling a light emission of a headlight of a vehicle, a corresponding device, and a corresponding computer program product, according to the main claims. Advantageous embodiments result from the respective subclaims and the following description.

The exemplary embodiments and/or exemplary methods of the present invention are based on the finding that during a debouncing window which is defined by a debouncing period or a debouncing distance, for example, for a change of a light emission of a vehicle headlight, for example within the scope of a high beam activation from low beam to high beam, the emission characteristics may be changed over via one or multiple intermediate stages. Thus, there is no direct, abrupt switchover between an input emission characteristic, which may correspond to a low beam, for example, to an output emission characteristic, which may correspond to a high beam, for example. Instead, a stepped change is made from the input emission characteristic to the output emission characteristic, or a last stage of the changeover to the output emission characteristic is carried out starting from an intermediate emission characteristic.

One advantage of the exemplary embodiments and/or exemplary methods of the present invention is that for the debouncing period or the debouncing distance, an advantageous compromise is found between visual range and proactive avoidance of blinding. Too frequent changing between a high beam and a low beam and an associated interfering effect on driving comfort and vision may be prevented. During the debouncing period or the debouncing distance, which involves proactive waiting between switching between a high beam and a low beam, as a result of the intermediate stage the driver has an improved visual range, and potential blinding of other motorists is avoided. Likewise, inconvenient switching to a low beam when the lights have previously been switched to a high beam and a vehicle appears shortly thereafter may be avoided. Thus, the visual range as well as the safety during the debouncing period or debouncing distance may be increased, and the likelihood of blinding a vehicle which may potentially appear may be minimized. The control is carried out in such a way that, for example, it is convenient for the driver.

On average, it is not necessary to rapidly switch over and activate the high beam and the low beam as often, which may be easily noticed by the driver and perceived as objectionable, is in particular on the low beam, i.e., when the visual range is reduced. An intermediate stage of the headlight is set, for example, between "remain on low beam" and "activate high beam." The driver thus obtains a wider view. However, traffic which appears is not blinded, since the intermediate stage is or becomes selected in such a way that, for example, the maximum reach of a light-dark cutoff extends to the level of the headlights. If, for example, other motorists appear during the remaining debouncing period, it is therefore not necessary to dim the lights, or if so, only minimally, which means less interference for the driver, for example due to a change in the amount of light in the traffic area.

The exemplary embodiments and/or exemplary methods of the present invention provide a method for controlling a light emission of at least one headlight of a vehicle, the method includes performing the following:

receiving a change enabling signal for performing a change of the light emission of the at least one headlight from an input emission characteristic to an output emission characteristic during a debouncing period and/or debouncing distance which begin(s) in response to the change enabling signal;

changing the light emission of the at least one headlight from the input emission characteristic to an intermediate emission characteristic in response to the change enabling signal; and changing the light emission of the at least one headlight from the intermediate emission characteristic to the output emission characteristic after the debouncing period and/or the debouncing distance has/have elapsed.

The vehicle may be a motor vehicle, in particular an on-road motor vehicle, for example a passenger car, a truck, a passenger carrying vehicle, or a utility vehicle. The at least one headlight may be, for example, a front headlight of the vehicle. The light emission of the headlight may be changeable in stages. The light emission of the headlight may be changed with regard to the emission characteristic of the headlight. The input emission characteristic, the intermediate emission characteristic, and the output emission characteristic may in each case represent a light angle, a light distribution, a brightness level, a light quantity, an illumination intensity, a illumination range, or the like, of the at least one headlight.

The input emission characteristic, the intermediate emission characteristic, and the output emission characteristic in each case may differ with respect to one of the mentioned parameters of the headlight. Corresponding values of the light angle, light distribution, brightness level, light quantity, illumination intensity, illumination range, or the like of the intermediate emission characteristic are between corresponding values of the input emission characteristic and the output emission characteristic. For example, the input emission characteristic may correspond to a smaller light angle or a smaller illumination range of the headlight than the output emission characteristic, or vice versa. For example, the input emission characteristic may correspond to a low beam or may be similar to a low beam, and the output emission characteristic may correspond to a high beam or may be similar to a high beam, or vice versa. The debouncing period represents a form of hysteresis. In this regard, the debouncing period may be understood, for example, as a delay time during the changing of the light emission of the headlight between the input emission characteristic and the output emission characteristic.

The debouncing period may be started directly upon receipt of the change enabling signal. The changing of the light emission from the input emission characteristic to the intermediate emission characteristic may likewise be started directly upon receipt of the change enabling signal. The changing of the light emission from the intermediate emission characteristic to the output emission characteristic may be started directly after the debouncing period has elapsed. A duration of the debouncing period may be predefined, or may be settable. The debouncing distance may be used as an alternative to the debouncing period. The debouncing distance may relate to a distance covered by the vehicle. When the speed of the vehicle is known, the debouncing distance may be ascertained from the debouncing period, and vice versa.

In at least one of the steps of the changing, the light emission may be changed gradually. In this regard, the light emission of the headlight may be changed continuously, i.e., in an infinitely variable manner, or in a ramped manner. The light emission of the at least one headlight may be changed gradually from the input emission characteristic to the intermediate emission characteristic, and additionally or alternatively, the light emission of the least one headlight may be changed gradually from the intermediate emission characteristic to the output emission characteristic. Such a gradual change offers the advantage that abrupt jumps in changing the emission characteristics may be avoided, so that the driver's eyes may become better accustomed to the particular newly adjusted emission characteristic. Driving safety is thus increased, since potential hazards may be better perceived.

According to one specific embodiment, at least one of the steps of the changing may be carried out when the change enabling signal has a value which indicates that at least one enabling condition for changing the light emission is met. Thus, at least one of the steps of the changing may be carried out in response to a specified value or logical level of the change enabling signal. The change enabling signal may have the specified value or logical level if the enabling condition for changing the light emission is met. The enabling condition which is met may define, for example, an absence of other vehicles in a traffic area that is relevant for blinding, an instantaneous position of the vehicle outside urban areas, or the like.

If the change enabling signal has a different value or logical level, at least one of the steps of the changing is not carried out. In addition, the change enabling signal may be received partially or continuously during the debouncing period. If the enabling condition is no longer being met during the debouncing period, and therefore the change enabling signal no longer has the specified value, performing at least one step of the changing may be terminated or canceled. Such a specific embodiment offers the advantage that the changing of the light emission is carried out only if there is no risk, for example, of other motorists being blinded. Traffic safety may be improved in this way.

In addition, a step of determining the intermediate emission characteristic based on vehicle properties, and additionally or alternatively based on travel data of the vehicle, may be provided. Vehicle properties concern, for example, a mounting height and configuration of the headlights of the vehicle. Travel data concern, for example, an instantaneous speed or yaw rate of the vehicle. The determination step may be carried out during the debouncing period and/or the debouncing distance.

In particular, the determination step may be carried out once or multiple times during the debouncing period. In this regard, an intermediate emission characteristic for controlling the light emission which is instantaneously determined in each case may be used. In other words, after the step of changing the light emission from the input emission characteristic to the intermediate emission characteristic, the intermediate emission characteristic is updated as a function of performing the determination step multiple times. Such a determination of the intermediate emission characteristic offers the advantage that an intermediate emission characteristic which is appropriate for the instantaneous driving situation is thus present. Blinding of other motorists during the debouncing period may thus be further reduced.

In the determination step, the intermediate emission characteristic may also be determined based on information concerning a slope of a roadway on which the vehicle is moving. The slope of the roadway may be ascertained, for example, with the aid of a camera having a measuring program for elevation estimation, with the aid of a navigation device having an elevation map, or some other device which is able to measure, estimate, or determine an elevation profile in the driving direction ahead of the vehicle. Thus, information concerning the slope may be received and used in the step of determining the intermediate emission characteristic in order to adapt the intermediate emission characteristic to the elevation profile, for example. Such a terrain adaptation offers the advantage that a visual range as well as avoidance of blinding may be improved.

In addition, a step of ascertaining a point in time for performing the step of changing the light emission of the at least one headlight from the input emission characteristic to the intermediate emission characteristic in response to the change enabling signal may be provided. In this regard, a point in time may be ascertained which is within the debouncing period. For example, the point in time may be ascertained in such a way that the step of changing the light emission of the at least one headlight from the input emission characteristic to the intermediate emission characteristic is carried out immediately in response to a receipt of the change enabling signal. Such a point in time ascertainment offers the advantage that an instantaneous traffic situation possibly involving other motorists in a traffic area that is relevant for blinding may be taken into account, and the step of changing may be carried out at an appropriate point in time. The risk of blinding other motorists is thus reduced.

In addition, a step of performing a comparison of the input emission characteristic and the intermediate emission characteristic may be provided. The step of changing the light emission of the at least one headlight from the input emission characteristic to the intermediate emission characteristic may be carried out as a function of the comparison. For example, if the input emission characteristic is in a first relation with respect to the intermediate emission characteristic, the step of changing the light emission of the at least one headlight from the input emission characteristic to the intermediate emission characteristic may be carried out. For example, if the input emission characteristic is in a second relation with respect to the intermediate emission characteristic or corresponds to same, performing the step of changing the light emission of the at least one headlight from the input emission characteristic to the intermediate emission characteristic may be skipped. Such a specific embodiment offers the advantage that a suitable intermediate emission characteristic may always be set independently of the input emission characteristic.

Furthermore, a step of changing the light emission of the at least one headlight from the intermediate emission characteristic to at least one further intermediate emission characteristic may be provided. In the step of changing the light emission of the at least one headlight, a change may be made from the at least one further intermediate emission characteristic to the output emission characteristic after the debouncing period and/or the debouncing distance has/have elapsed. The at least one further intermediate emission characteristic may have a value that is between the intermediate emission characteristic and the output emission characteristic.

Thus, multiple intermediate emission characteristics may also be present between the input emission characteristic and the output emission characteristic. These intermediate emission characteristics may be adopted or run through during the entire change of the light emission from the input emission characteristic to the output emission characteristic. Such a further intermediate emission characteristic offers the advantage that during the changing of the light emission of the at least one headlight, abrupt jumps or changes in the emission characteristics may be further reduced.

Moreover, the exemplary embodiments and/or exemplary methods of the present invention provide a device which is configured to perform or implement the steps of the method according to the present invention. In particular, the device may have units which are each configured to perform one step of the method. In addition, as a result of this variant of the present invention in the form of a device, the object of the present invention may be achieved quickly and efficiently.

In the present context, a device may be understood to mean an electrical device or control unit which processes sensor signals and outputs control signals as a function of same. The device may have an interface which may be provided by hardware and/or software. In a hardware configuration, the interfaces may be, for example, part of a so-called system ASIC which contains various functions of the device. However, it is also possible for the interfaces to be dedicated, integrated circuits or to be composed, at least partially, of discrete components. In a software configuration, the interfaces may be software modules which are present in addition to other software modules on a microcontroller, for example.

Also advantageous is a computer program product having program code which is stored on a machine-readable carrier such as a semiconductor memory, a hard drive memory, or an optical memory and used for performing the method according to one of the above-described specific embodiments when the program is executed on a device.

The exemplary embodiments and/or exemplary methods of the present invention are explained in greater detail as an example, with reference to the appended drawings.

BRIEF DESCRIPTION OF THE DRAWINGS

FIGS. 1A to 2E show schematic illustrations of various emission characteristics of vehicle headlights.

DETAILED DESCRIPTION

Figure 1A:
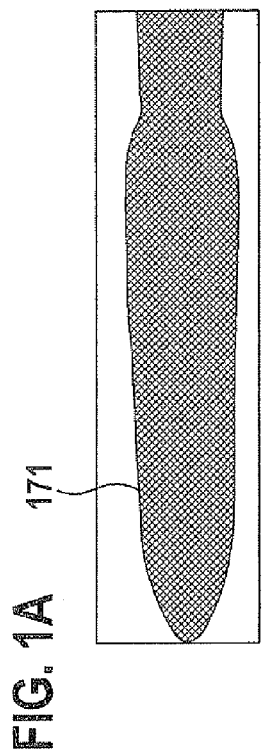
Figure 1B:
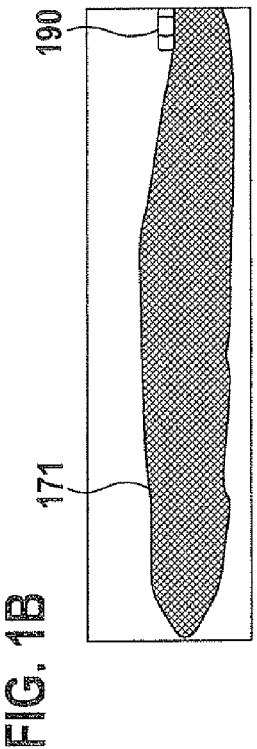
Figure 1C:
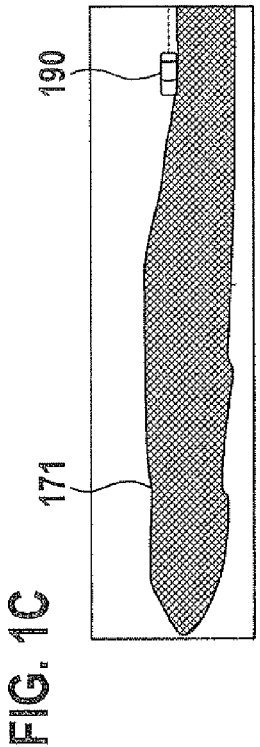
Figure 1D:
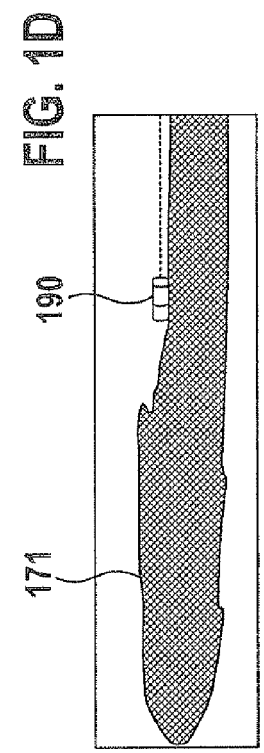
Figure 1E:
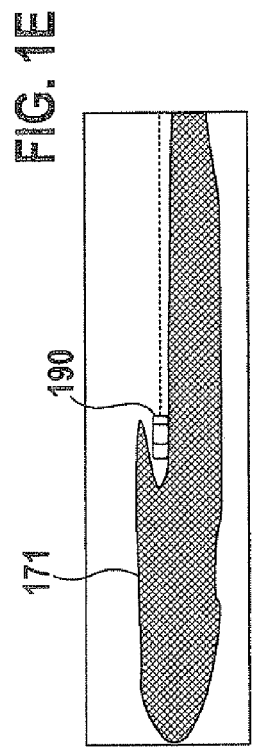

In the following description of exemplary embodiments of the present invention, identical or similar reference numerals are used for the elements having a similar action which are illustrated in the various figures, and a repeated description of these elements is dispensed with.

FIGS. 1A through 1F show schematic illustrations of various emission characteristics 171 of vehicle headlights. The emission characteristics 171 are represented as light distributions or coverage ranges or illumination ranges of vehicle headlights. Specifically, the various emission characteristics 171 may be adjusted with the aid of a high beam assistance system such as adaptive high beam control (AHC), for example. Emission characteristics 171 are shown from an aerial perspective. In FIGS. 1A through 1F, emission characteristics 171 are generated in each case by headlights of a vehicle (not shown), such a vehicle being situated at the left edge of the figure in each of FIGS. 1A through 1F.

Figure 1F:
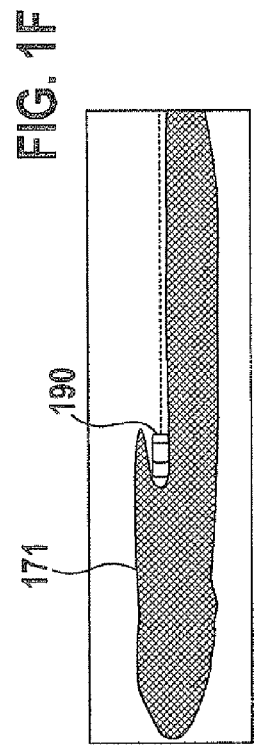

Emission characteristics 171 have a light distribution, i.e., a pattern of light intensities. Another vehicle 190 is also shown in FIGS. 12 through 1F. In the progression of the figures from 12 through 1F, other vehicle 190 is situated at an increasingly smaller distance from the vehicle which is generating emission characteristics 171. Emission characteristics 171 are adjusted in each case in such a way that other vehicle 190 is situated outside the light distribution or coverage range of the vehicle headlights. AHC has been developed due to the fact that a low beam has a low illumination range at speeds above 80 km/h, for example. AHC may dynamically adjust the coverage range of a headlight so that a maximum coverage range of the headlight is set without blinding other vehicles 190. An adjustment of the coverage range thus takes place.

FIGS. 2A through 2E show schematic illustrations of various emission characteristics of vehicle headlights. A vehicle 200 and various emission characteristics 271 are shown. Another vehicle 290 is also shown in each of FIGS. 2B through 2E. Emission characteristics 271 are illustrated as a light cone from the headlights of vehicle 200. The various emission characteristics 271 may be adjusted with the aid of a high beam assistance system such as adaptive high beam control (AHC), for example. Emission characteristics 171 are shown in a side view. In FIG. 2B, other vehicle 290 is situated at a greater distance from vehicle 200 than in FIG. 2C. In FIGS. 2D and 2E, a roadway on which vehicle 200 and other vehicle 290 are present has at least one slope or a gradient. Emission characteristics 271 are in each case adjusted in such a way that other vehicle 290 is situated outside the light distribution or coverage range of the vehicle headlights. The coverage range or emission characteristic 271 is adjusted via an adjustment of different emission angles of the headlights of vehicle 200.

Figure 3:
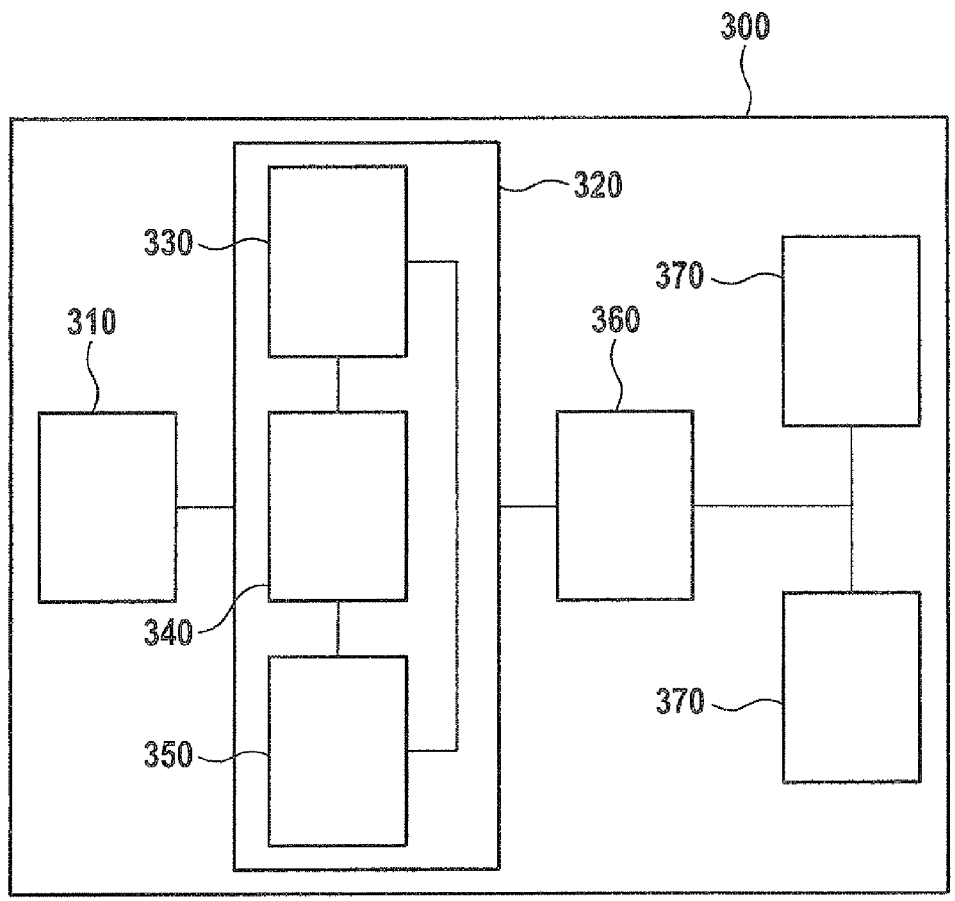
FIG. 3 shows a schematic illustration of a vehicle having a control device according to one exemplary embodiment of the present invention.

FIG. 3 shows a schematic illustration of a vehicle having a control device according to one exemplary embodiment of the present invention. Vehicle 300 has an enabling device 310, a control device 320 having a receiving device 330, a first change device 340 and a second change device 350, a control unit 360, and two headlights 370. Enabling device 310 is connected to control device 320 via a communication interface, for example at least one signal line or the like. Control unit 360 is connected to control device 320 via a further communication interface, for example at least one signal line or the like. Control device 320 is thus connected between enabling device 310 and control unit 360. Headlights 370 are connected to control unit 360 via a further communication interface, for example at least one signal line or the like. Control unit 360 is thus connected between control device 320 and headlights 370. Although not illustrated in this way in FIG. 3, control unit 360 may also be part of control device 320, or control device 320 may also be a part of control unit 360.

Enabling device 310 may have, for example, a vehicle camera, an image processing electronics system, for example for suitable methods for image processing, image analysis, pattern recognition, object recognition, or the like, vehicle sensors for obtaining travel data, a transceiver for position data, a signal processing electronics system, etc. Enabling device 310 is configured to generate a change enabling signal. Various logical values of the change enabling signal may represent a permission or a prohibition, and optionally other information, for performing a change of the light emission of headlights 370 from an input emission characteristic to an output emission characteristic. The change of the light emission of headlights 370 from the input emission characteristic to the output emission characteristic is carried out during a debouncing period which begins in response to the change enabling signal. In the present and further exemplary embodiments, a debouncing distance which begins in response to the change enabling signal may be used in addition to or instead of the debouncing period. Enabling device 310 is configured to output the change enabling signal to control device 320.

Control device 320 has receiving device 330, first change device 340, and second change device 350. Control device 320 is configured to perform a control of a light emission of headlights 370 of vehicle 300.

Receiving device 330 is configured to receive the change enabling signal from enabling device 310. If the change enabling signal has a logical value which represents a permission for performing the change of the light emission of headlights 370 from the input emission characteristic to the output emission characteristic, receiving device 330 may be configured to output or relay the change enabling signal to first change device 340, and additionally or alternatively, to second change device 350. In response to the receipt of the change enabling signal having a logical value which represents a permission for performing the change, receiving device 330 may additionally or alternatively be configured to start a timer, generate a first time signal, and output same to first change device 340, and additionally or alternatively, to generate a second time signal and output same to second change device 350. The debouncing period begins upon receipt of the change enabling signal having a logical value which represents a permission for performing the change.

First change device 340 is configured to receive the change enabling signal, and additionally or alternatively, to receive the first time signal, from receiving device 330. First change device 340 is configured to change or cause a change of the light emission of headlights 370 in response to the change enabling signal, and additionally or alternatively, to change or cause a change of the first time signal from the input emission characteristic to an intermediate emission characteristic. For this purpose, first change device 340 or a device associated with same may optionally determine the intermediate emission characteristic. The determination may be carried out based on vehicle properties and/or travel data of vehicle 300, and optionally, also based on information concerning a slope of a roadway on which vehicle 300 is moving. In addition, first change device 340 or a device associated with same may optionally ascertain a point in time for performing the change, for example by using the first time signal. First change device 340 is configured to output the intermediate emission characteristic and/or the point in time in the form of a first control information to control unit 360, and optionally to second change device 350.

Second change device 350 is configured to receive the change enabling signal, and additionally or alternatively to receive the second time signal, from receiving device 330, and optionally to receive the first control information from first change device 340. Second change device 350 is configured to change or cause a change of the light emission of headlights 370 from the intermediate emission characteristic to the output emission characteristic after the debouncing period has elapsed. For example, the second time signal from receiving device 330 may indicate the elapse of the debouncing period, or the elapse of the debouncing period may be ascertained based on the second time signal. In addition, second change device 350 or a device associated with same may optionally ascertain a point in time for performing the change, for example by using the second time signal. Second change device 350 is configured to output the emission characteristic and/or the point in time in the form of a second control information to control unit 360.

Control unit 360 is configured to receive the first control information and/or the second control information from control device 320. Control unit 360 is also configured to generate a control signal for controlling headlights 370. In generating the control signal, the control unit may take into account or use the first control information and/or the second control information for controlling the light emission of headlights 370. The control signal may thus contain the first control information and/or the second control information. Control unit 360 is configured to output the control signal to headlights 370.

Headlights 370 may receive the control signal from control unit 360. The first control information and/or the second control information in the control signal may cause the light emission of headlights 370 to change from the input emission characteristic to the output emission characteristic via the intermediate emission characteristic, during the debouncing period.

Figure 4:
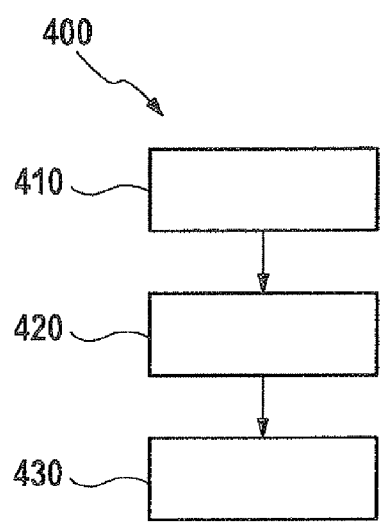
FIG. 4 shows a flow chart of a method according to one exemplary embodiment of the present invention.

FIG. 4 shows a flow chart of a method 400 for controlling a light emission of at least one headlight of a vehicle according to one exemplary embodiment of the present invention. Method 400 has a step of receiving 410 a change enabling signal for performing a change of the light emission of the at least one headlight from an input emission characteristic to an output emission characteristic during a debouncing period which begins in response to the change enabling signal. Method 400 also has a step of changing 420 the light emission of the at least one headlight from the input emission characteristic to an intermediate emission characteristic in response to the change enabling signal. Method 400 also has a step of changing 430 the light emission of the at least one headlight from the intermediate emission characteristic to the output emission characteristic after the debouncing period has elapsed. Method 400 may advantageously be carried out in combination with a device such as the control device from FIG. 3, for example. Thus, the control device from FIG. 3 may be configured to perform the steps of method 400.

Figure 5A:
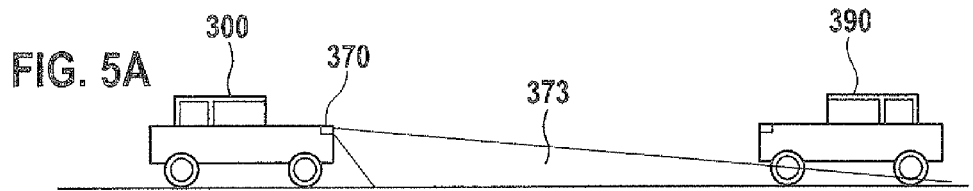
FIGS. 5A to 8D show illustrations of various emission characteristics of vehicle headlights according to exemplary embodiments of the present invention.
Figure 5B:
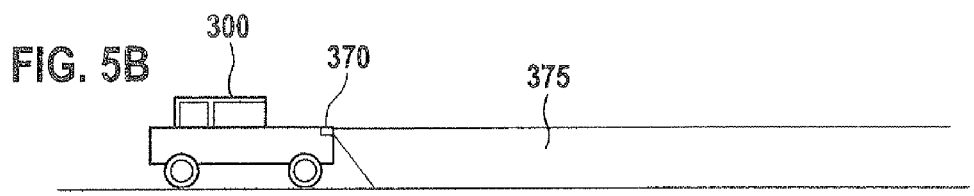
Figure 5C:
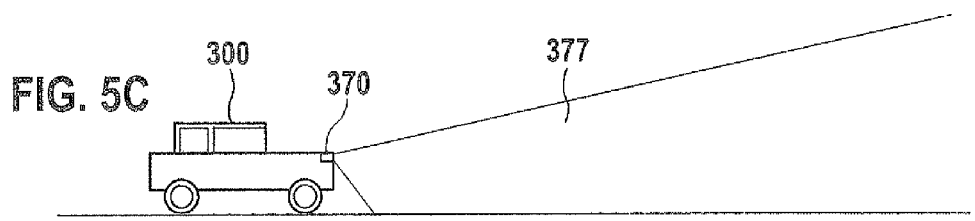

FIGS. 5A through 5C show schematic illustrations of various emission characteristics of vehicle headlights according to exemplary embodiments of the present invention. A vehicle 300 having a headlight 370 and an emission characteristic in the form of a light cone is shown in a side view in each of FIGS. 5A through 5C. In addition, a flat roadway is shown in each case. Vehicle 300 may be the vehicle having the control device from FIG. 3. In FIG. 5A the emission characteristic is an input emission characteristic 373; another vehicle 390 is also shown. Input emission characteristic 373 may correspond to a low beam, for example. Input emission characteristic 373 or the light cone which is generated based on same may have an upper boundary which converges with the roadway in the area of other vehicle 390. Other vehicle 390 represents oncoming traffic with respect to vehicle 300. In FIG. 5B the emission characteristic is an intermediate emission characteristic 375, and no other vehicle is illustrated. Intermediate emission characteristic 375 or the light cone which is generated based on same may have an upper boundary which extends approximately parallel to the roadway. In FIG. 5C the emission characteristic is an output emission characteristic 377. Output emission characteristic 377 may correspond, for example, to a high beam or the like. Output emission characteristic 377 or the light cone which is generated based on same may have an upper boundary which diverges from the roadway.

Figure 9:
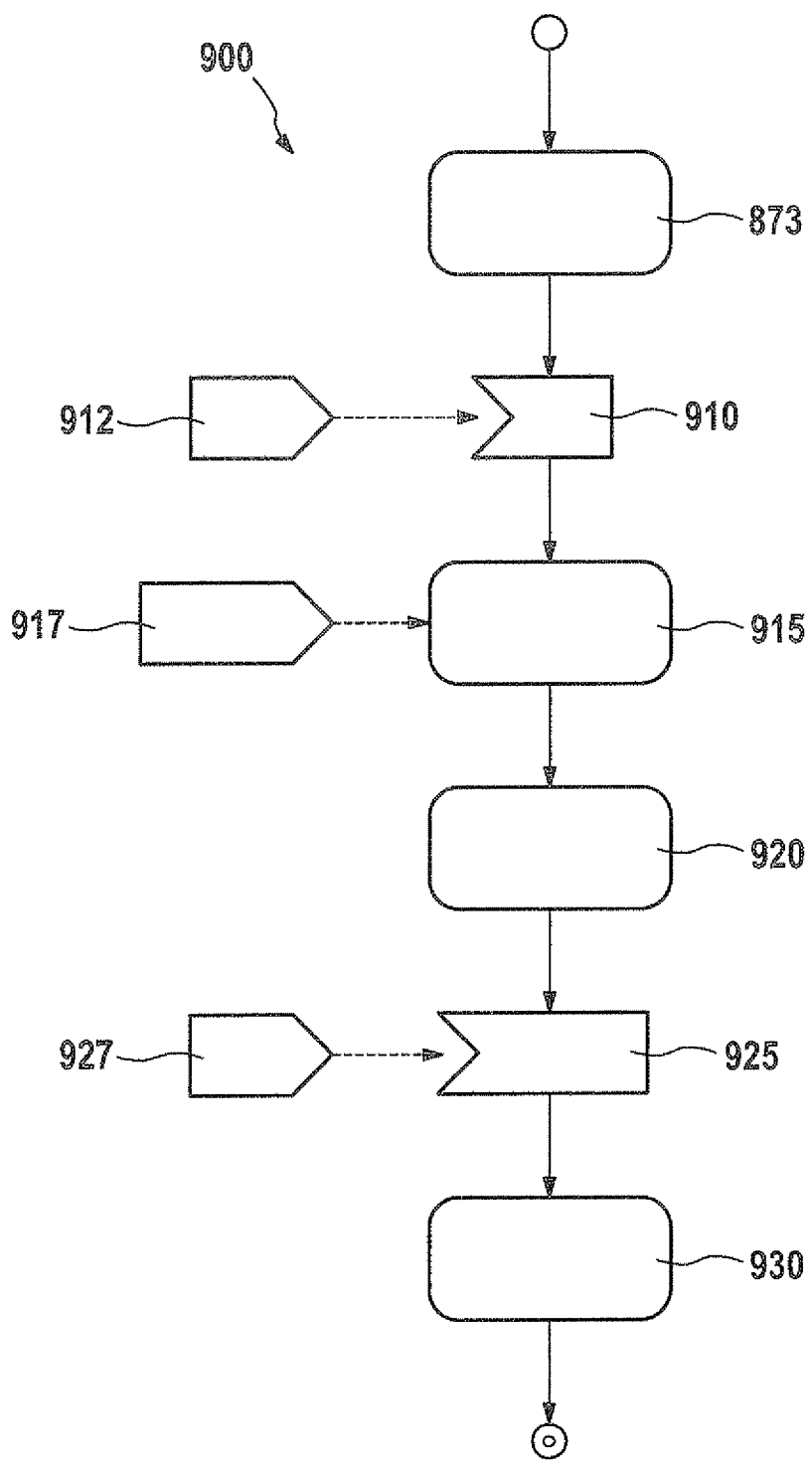
FIGS. 9 and 10 show flow charts of algorithms according to exemplary embodiments of the present invention.

The emission characteristics illustrated in FIGS. 5A through 5C may result during use of a method for controlling a light emission, such as the method from FIG. 4, for example. After another vehicle 390 is no longer in the traffic area, after a first time period of the debouncing period the light cone is raised, based on input emission characteristic 373, until it does not exceed 0°, i.e., is emitted parallel to the plane of the roadway or in the direction of the horizon (see FIG. 5B). The first time period of the debouncing period may also approach zero; i.e., it may be immediately set to 0°, for example in the sense of head-on debouncing. As a result of the maximum horizontal emission of the light in intermediate emission characteristic 375, other motorists 390 are ideally not blinded when they appear, since the maximum reach of a light-dark cutoff extends to the level of a headlight of another vehicle 390. The driver of vehicle 300 still has a farther visual range, since significantly more light is on the roadway. After a further time period of the debouncing period, which may be a waiting time, the light-dark cutoff is raised even higher, and a switch is made to high beam 377 if necessary (see FIG. 5C). FIG. 9 shows a schematic sequence of the underlying algorithm for the emission angle adjustment for headlights.

Figure 6A:
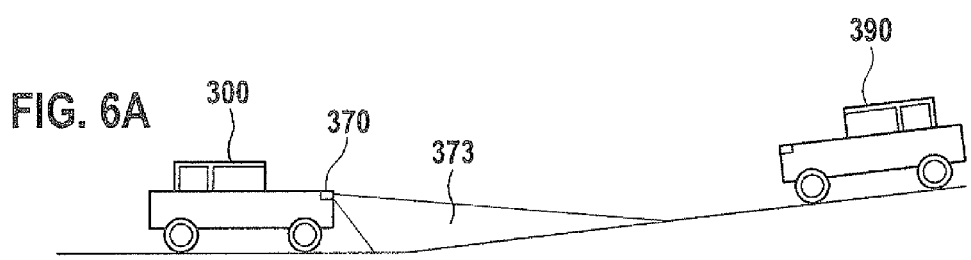
Figure 6B:
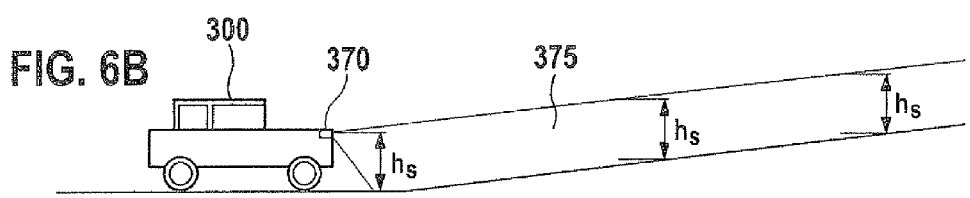
Figure 6C:
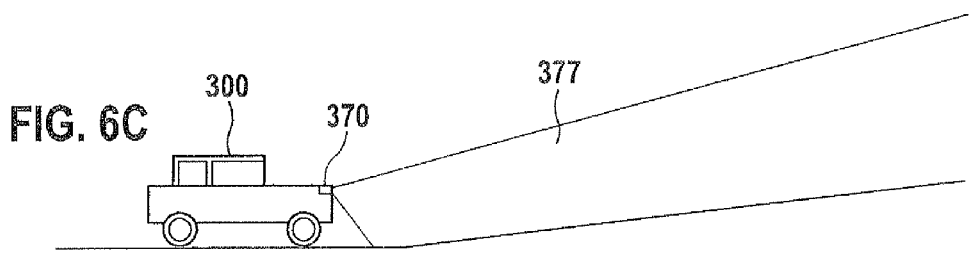

FIGS. 6A through 6C show schematic illustrations of various emission characteristics of vehicle headlights according to exemplary embodiments of the present invention. The illustration in FIGS. 6A through 6C corresponds to the illustration in FIGS. 5A through 5C, except that the roadway is sloped in places. Specifically, in FIG. 6A, the roadway is flat from a left edge of the figure to a point between vehicle 300 and other vehicle 390, and beyond this point all the way to the right edge of the figure the roadway is sloped. FIG. 6B also shows a headlight mounting height $h_s$. Intermediate emission characteristic 375 or the light cone generated based on same in FIG. 6B may have an upper boundary which extends approximately parallel to the sloped portion of the roadway, at a distance therefrom approximately equal to headlight mounting height $h_s$.

The emission characteristics illustrated in FIGS. 6A through 6C may result during use of a method for controlling a light emission, such as the method from FIG. 4, for example. If, for example, the method from FIG. 4 or the control device from FIG. 3 uses a gradient sensor, for example a camera having a measuring program for elevation estimation, a navigation device having an elevation map, etc., which measures or estimates the elevation profile ahead of vehicle 300, instead of an emission angle of 0° an emission angle of intermediate emission characteristic 375 which is adapted to the elevation profile may be set. The maximum size of the emission angle must be such that the headlight light cone does not exceed headlight mounting height $h_s$ (see FIG. 6B). This adjustment of the light-dark cutoff for an uneven roadway does not depend on the use of a gradient sensor, and only a raise to 0° may be carried out, as in FIG. 5B.

Figure 7A:
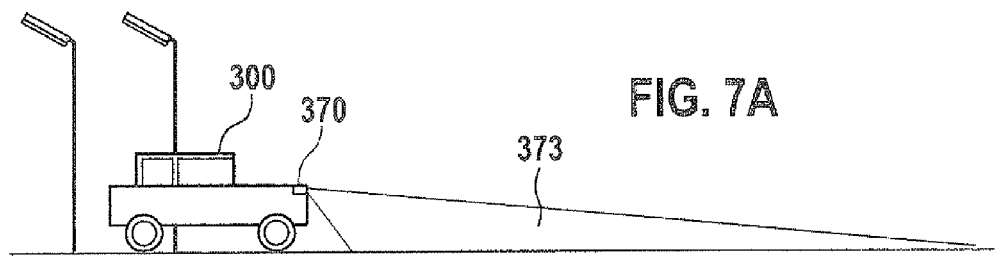
Figure 7B:
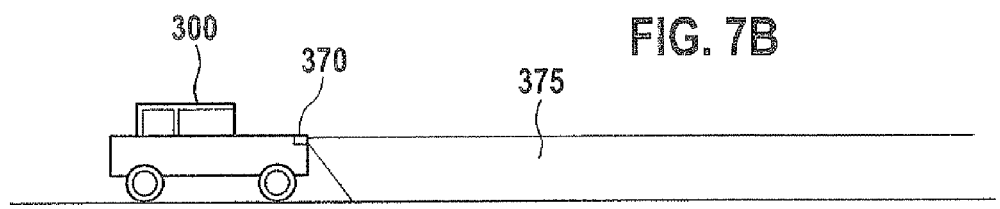
Figure 7C:
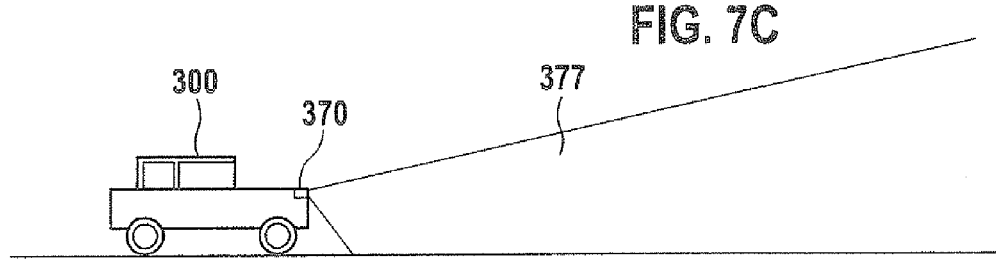

FIGS. 7A through 7C show schematic illustrations of various emission characteristics of vehicle headlights according to exemplary embodiments of the present invention. The illustration in FIGS. 7A through 7C corresponds to the illustration in FIGS. 5A through 5C, except that two street lights are shown as an example in FIG. 7A to represent a thoroughly illuminated area.

The emission characteristics illustrated in FIGS. 7A through 7C may result during use of a method for controlling a light emission, such as the method from FIG. 4, for example. No output emission characteristic 377 may be set, or no high beam may be switched on, within such a thoroughly illuminated area, for example within a city. After leaving the city, the high beam may once again be switched on. In this case, the light-dark cutoff may likewise be raised via an intermediate stage or intermediate emission characteristic 375 if no other vehicle is in the traffic area. Thus, the intermediate stage or intermediate emission characteristic 375 is set after leaving a thorough roadway illumination. Output emission characteristic 377 may be set subsequent to the intermediate stage or intermediate emission characteristic 375.

FIGS. 8A through 8D show diagrams of various emission characteristics of vehicle headlights according to exemplary embodiments of the present invention. In each of the diagrams, time t is plotted on the abscissa axis, three time values, i.e., points in time t1, t2, t3, being charted, and a headlight angle a is plotted on the ordinate axis, three headlight angle values a1, a2, and a3 being charted. A variation of headlight angle a over time t is shown in each of the diagrams. The time segment from point in time t1 to point in time t3 represents a debouncing period in a method for controlling a light emission of at least one headlight of a vehicle, such as the method from FIG. 4, for example. The headlight angle patterns illustrated in FIGS. 8A through 8D represent emission characteristics, and may result during use of the method for controlling a light emission from FIG. 4.

Figure 8A:
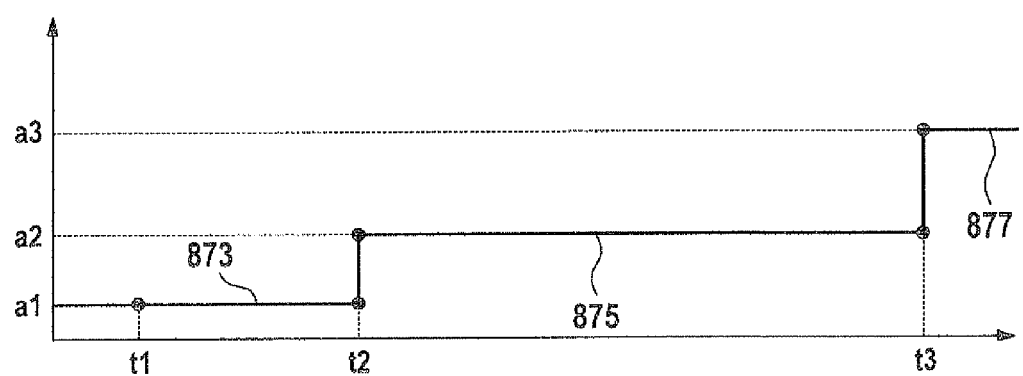

FIG. 8A shows an input headlight angle 873 which corresponds to an input emission characteristic, for example in the form of a low beam, i.e., an initial stage, an intermediate headlight angle 875 which corresponds to an intermediate emission characteristic in the form of a reduced-blinding intermediate stage, and an output headlight angle 877 which corresponds to an output emission characteristic in the form of a high beam, i.e., a blinding stage. Input headlight angle 873 is present between point in time t1, i.e., a start of the debouncing period, and point in time t2, having a constant value a1. The headlight angle is increased to intermediate headlight angle 875 at point in time t2. Intermediate headlight angle 875 is present from point in time t2 to point in time t3, i.e., an end of the debouncing period, having a constant value a2. The headlight angle is increased to output headlight angle 877 at point in time t3 having a value a3. Value a2 is between value a1 and value a3. With additional reference to the method from FIG. 4, FIG. 8A shows how a switch is made from initial stage 873, for example after the last other vehicle disappears (t1), to reduced-blinding intermediate stage 875 (t2), before blinding stage 877, for example a high beam, is switched on (t3). The switching between the stages is carried out abruptly.

Figure 8B:
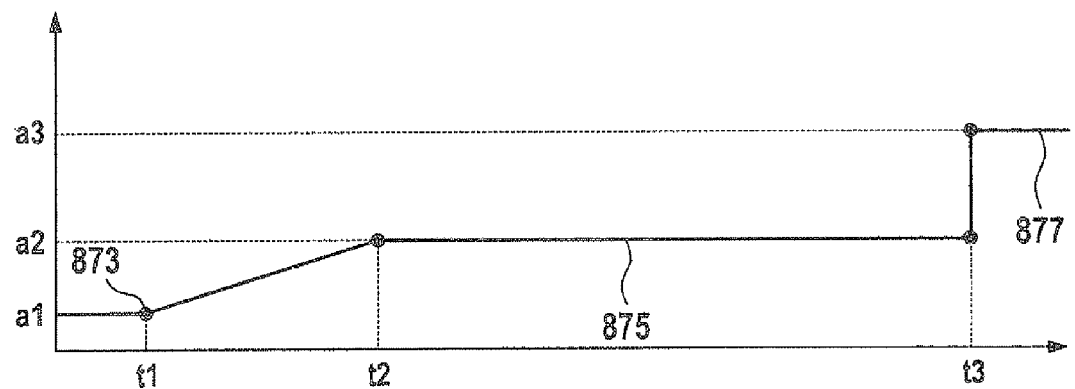

The illustration in FIG. 8B corresponds to the illustration in FIG. 8A, except that input headlight angle 873 having value a1 is present at point in time t1, i.e., a start of the debouncing period, and is continuously increased to intermediate headlight angle 875, having value a2, until point in time t2. With additional reference to the method from FIG. 4, FIG. 8A shows a ramp-shaped increase of the headlight angle from initial stage 873 (t1) to intermediate stage 875 (t2) after no other vehicle is present in the figure (t1), or a city is departed (t1). However, there is an abrupt switchover to blinding stage 877 (t3). Thus, there is a continuous switchover to intermediate stage 875 between point in time t1 and point in time t2, followed by an abrupt switchover to blinding stage 877 at point in time t3. By using such a ramp-shaped increase it is possible for the various stages to start (relatively) slowly, whereby the headlight angle may be changed in a ramped manner, as shown in FIG. 8B.

Figure 8C:
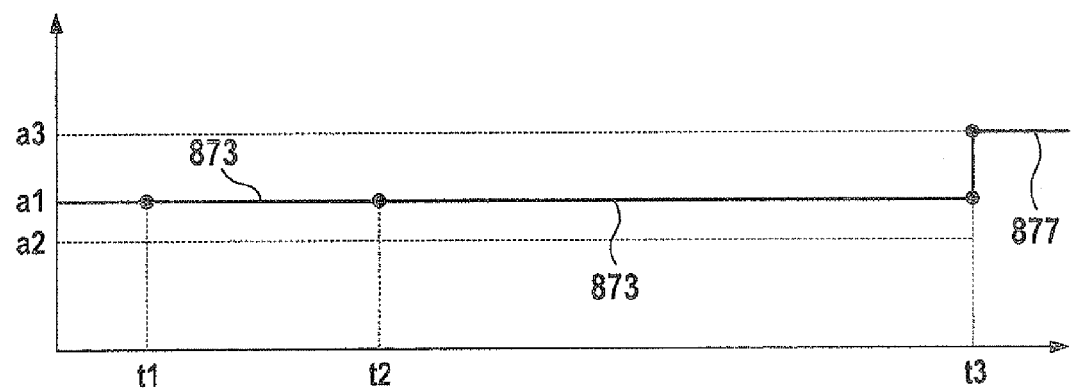
Figure 10:
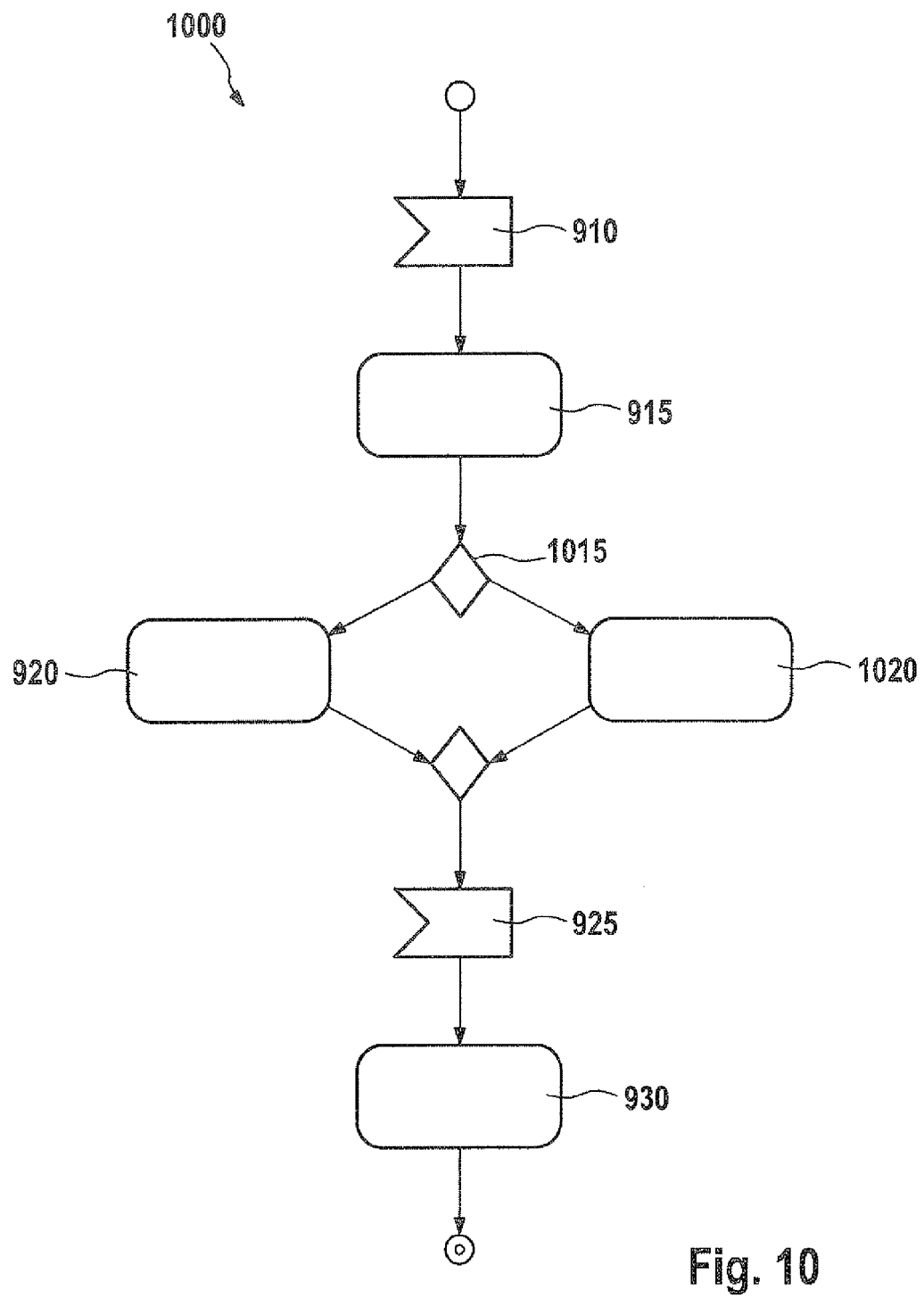

The illustration in FIG. 8C corresponds to the illustration in FIG. 8A, except that input headlight angle 873 having a constant value a1 is present between point in time t1 and point in time t3. Value a1 is increased relative to corresponding value a1 from FIGS. 8A and 8B, and is between value a2 and value a3. The headlight angle is increased from input headlight angle 873 to output headlight angle 877 at point in time t3. With additional reference to the method from FIG. 4, FIG. 8C thus shows that input headlight angle 873 is maintained when the initial angle, i.e., input headlight angle 873, is greater than setpoint angle a2 of the intermediate stage in comparison to the standard behavior as shown in FIG. 8A. Thus, an increased input headlight angle 873 may be maintained when initial angle a1 is greater than normal intermediate stage a2. If an emission angle is set at point in time t1 with the aid of AHC, for example, which is above the horizontal (0°), i.e., greater than the slope measured by a gradient sensor, this initial light distribution is maintained as the intermediate stage, the same as for a classical debouncing. As a result, the visual range of the driver is not reduced, but, due to the greater risk of blinding, is also not increased, as shown in FIG. 8C. A flow chart of an underlying algorithm is shown in FIG. 10.

Figure 8D:
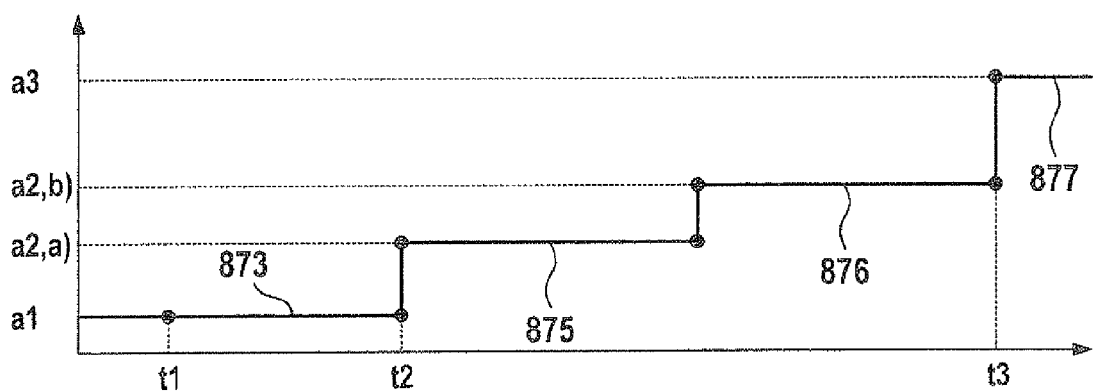

The illustration in FIG. 8D corresponds to the illustration in FIG. 8A, except that, instead of the one intermediate headlight angle having value a2, in this case two intermediate headlight angles are shown. A first intermediate headlight angle 875 has a value a2, a), which is less than a second intermediate headlight angle 876 which has a value a2, b). The relation of all angular values in FIG. 8D is as follows: a1<a2, a)<a2, b)<a3. Input headlight angle 873 is increased to first intermediate headlight angle 875 at point in time t2. First intermediate headlight angle 875 is increased to second intermediate headlight angle 876 during the time period between point in time t2 and point in time t3. Second intermediate headlight angle 876 is increased to output headlight angle 877 at point in time t3. Thus, FIG. 8C shows one possible exemplary embodiment having multiple stages or intermediate stages, it being possible in principle to provide not just one intermediate stage, but, rather, any desired number of intermediate stages.

FIG. 9 shows a flow chart of a method for controlling a light emission of at least one headlight of a vehicle according to one exemplary embodiment of the present invention, in the form of an algorithm 900.

At the beginning a state 873 is present, which may correspond to a low light-dark cutoff, a low beam, or the input headlight angle from FIGS. 8A, 8B, and 8D. A first timer 912 or a signal "flow" from same is awaited in a step 910. An intermediate stage is computed in a step 915. A gradient sensor 917 may supply sensor data as an input variable for step 915, gradient sensor 917 being optional. The intermediate stage is started in a step 920. The intermediate stage may be the intermediate stage or an intermediate headlight angle from FIGS. 8A, 8B, and 8D, and may be an emission angle of 0°, for example. A timer 927 of a next-higher stage or a signal "flow" from same is awaited in a step 925. Step 915 and/or step 925 may be optional if multiple intermediate stages are provided. In a step 930, a high light-dark cutoff is started which may correspond to a high beam or the output headlight angle from FIGS. 8A through 8D.

Thus, FIG. 9 shows a flow chart of an algorithm without maintenance of higher angles. In principle, an expansion with a gradient sensor and multiple intermediate stages is possible.

FIG. 10 shows a flow chart of a method for controlling a light emission of at least one headlight of a vehicle according to one exemplary embodiment of the present invention, in the form of an algorithm 1000.

It is determined in a step 910 that a first time period of a debouncing period has elapsed. An intermediate stage or a setpoint angle for an intermediate stage is computed in a step 915. A check is made in a step 1015 as to whether the setpoint angle for the intermediate stage is greater than an actual angle. If the setpoint angle for the intermediate stage is greater than the actual angle, a step 920 is carried out in which the setpoint angle for the intermediate stage is started. The setpoint angle for the intermediate stage may correspond to the intermediate headlight angle from FIGS. 8A, 8B, and 8D, for example an emission angle of 0°. If the setpoint angle for the intermediate stage is not greater than the actual angle, a step 1020 is carried out in which the actual angle is maintained. It is determined in a step 925 that a second time period of the debouncing period has elapsed. A high headlight angle, which may correspond to the output headlight angle from FIGS. 8A through 8D, for example a high beam, is started in a step 930.

Thus, FIG. 10 shows a flow chart of an algorithm for maintaining the maximum angle during the control.

Exemplary embodiments of the present invention are summarized below with reference to FIGS. 3 through 10.

Method 400, which may be carried out in combination with control device 320, is, in a manner of speaking, a detailed implementation of the sliding illumination range (SIR), a special staged concept instead of continuous adjustment, i.e., a special case of illumination range regulation. This allows an increase of the visual range during a debouncing period for preventative avoidance of blinding, for example also using adaptive high beam control (AHC), CHC, or adaptive low beam control (ALC). The emission angle of a headlight 370 is raised in an intermediate stage or at least one intermediate stage. The debouncing period for the various stages may be split as shown in FIG. 8A, for example.

If, for example, a high beam is to be switched on, the headlight angle may first be set to maximum angle 877 in a ramp-like manner before a high beam distribution is set. The switchover to high beam is thus less abrupt, which is more convenient for the driver. If no sliding illumination range (adaptive high beam control (AHC)) is provided in which the light-dark cutoff (LDC) between the low beam and the high beam may be set in a quasi-infinitely variable manner, the light-dark cutoff may be adapted by dynamic illumination range regulation. For a pure high beam assistance system (high beam activation (HBA)) having integrated dynamic illumination range regulation (also referred to as adaptive low beam control (ALC)), this is useful for load compensation, for example, which is always installed in xenon headlights, for example, due to regulatory requirements. If a high beam has not yet been switched on, as in one exemplary embodiment, the light-dark cutoff may still be raised in order to raise the visual range before the high beam debouncing period has elapsed, a proactive avoidance of blinding being maintained. Instead of a debouncing period, a debouncing distance, in which a vehicle travels a certain distance before a different emission characteristic is adopted, or a combination of both, may be used.

The exemplary embodiments which are described and shown in the figures are selected only as examples. Different exemplary embodiments may be combined with one another in their entirety, or with respect to individual features. In addition, one exemplary embodiment may be supplemented with features of another exemplary embodiment. Furthermore, method steps according to the present invention may be repeated and carried out in a sequence other than that described. If an exemplary embodiment includes an "and/or" conjunction between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for controlling a light emission of at least one headlight of a vehicle, the method comprising:
   receiving a change enabling signal for performing a change of the light emission of the at least one headlight from an input emission characteristic to an output emission characteristic during at least one of a debouncing period and a debouncing distance which begin in response to the change enabling signal;
   changing the light emission of the at least one headlight from the input emission characteristic to an intermediate emission characteristic in response to the change enabling signal; and
   changing the light emission of the at least one headlight from the intermediate emission characteristic to the output emission characteristic after the at least one of the debouncing period and the debouncing distance has elapsed.

2. The method of claim 1, wherein the light emission is changed gradually in at least one of the changings.

3. The method of claim 1, wherein at least one of the changings is performed when the change enabling signal has a value which indicates that at least one enabling condition for changing the light emission is met.

4. The method of claim 1, further comprising:
   determining the intermediate emission characteristic based on at least one of vehicle properties and travel data of the vehicle, the determining being performed during the at least one of the debouncing period and the debouncing distance.

5. The method of claim 4, wherein in the determining, the intermediate emission characteristic is also determined based on information concerning a slope of a roadway on which the vehicle is moving.

6. The method of claim 1, further comprising:
   ascertaining a point in time for performing the changing of the light emission of the at least one headlight from the input emission characteristic to the intermediate emission characteristic in response to the change enabling signal.

7. The method of claim 1, further comprising:
   comparing the input emission characteristic and the intermediate emission characteristic, the changing of the light emission of the at least one headlight from the input emission characteristic to the intermediate emission characteristic being performed as a function of the comparing.

8. The method of claim 1, further comprising:
   changing the light emission of the at least one headlight from the intermediate emission characteristic to at least one further intermediate emission characteristic, in the changing, the light emission of the at least one headlight being changed from the at least one further intermediate emission characteristic to the output emission characteristic after the at least one of the debouncing period and the debouncing distance has elapsed.

9. A device for controlling a light emission of at least one headlight of a vehicle, comprising:
   a receiving arrangement to receive a change enabling signal for performing a change of the light emission of the at least one headlight from an input emission characteristic to an output emission characteristic during att least one of a debouncing period and a debouncing distance which begin in response to the change enabling signal;
   a first changing arrangement to change the light emission of the at least one headlight from the input emission characteristic to an intermediate emission characteristic in response to the change enabling signal; and
   a second changing arrangement to change the light emission of the at least one headlight from the intermediate emission characteristic to the output emission characteristic after the at least one of the debouncing period and the debouncing distance has elapsed.

10. A computer readable medium having a computer program, which is executable by a processor, comprising:
    a program code arrangement having program code for controlling a light emission of at least one headlight of a vehicle, by performing the following:
       receiving a change enabling signal for performing a change of the light emission of the at least one headlight from an input emission characteristic to an output emission characteristic during att least one of a debouncing period and a debouncing distance which begin in response to the change enabling signal;
       changing the light emission of the at least one headlight from the input emission characteristic to an intermediate emission characteristic in response to the change enabling signal; and
       changing the light emission of the at least one headlight from the intermediate emission characteristic to the output emission characteristic after the at least one of the debouncing period and the debouncing distance has elapsed.

* * * * *